United States Patent [19]

Packard et al.

[11] Patent Number: 4,717,329

[45] Date of Patent: Jan. 5, 1988

[54] APPARATUS FOR COMPRESSIVELY TREATING TRAVEL FLEXIBLE SHEET MATERIAL

[75] Inventors: Thomas D. Packard, Stoughton; William C. Goodchild, Attleboro, both of Mass.

[73] Assignee: Bird Machine Company, Inc., South Walpole, Mass.

[21] Appl. No.: 948,319

[22] Filed: Dec. 30, 1986

[51] Int. Cl.[4] .......... B29C 53/28; B31F 1/14

[52] U.S. Cl. .......... 425/328; 26/18.6; 162/280; 162/281; 264/282; 264/283; 425/374

[58] Field of Search .......... 425/328, 374; 162/280–282; 72/166, 168, 190, 191, 197, 206, 250; 26/18.6; 264/282, 283

[56] References Cited

U.S. PATENT DOCUMENTS

| | | | |
|---|---|---|---|
| 1,548,783 | 8/1925 | Lorenz | 162/282 X |
| 1,751,471 | 3/1930 | Campbell | 162/280 |
| 3,122,767 | 3/1964 | Carvill | 162/281 X |
| 3,142,091 | 7/1964 | Curtiss | 425/374 X |
| 3,260,778 | 7/1966 | Walton | 264/282 |
| 3,416,192 | 12/1968 | Packard | 425/374 |
| 3,597,814 | 8/1971 | Trifunovic et al. | 26/18.6 |
| 3,641,234 | 2/1972 | Trifunovic et al. | 264/282 |
| 3,810,280 | 5/1974 | Walton et al. | 26/18.6 |
| 3,866,266 | 2/1975 | Dunlap | 162/281 X |
| 3,869,768 | 3/1975 | Walton et al. | 264/282 X |
| 4,090,385 | 5/1978 | Packard | 72/191 |
| 4,141,112 | 2/1979 | Klemz | 162/281 X |
| 4,206,528 | 6/1980 | Klemz | 162/281 X |
| 4,367,120 | 1/1983 | Hendrikz | 162/281 |

FOREIGN PATENT DOCUMENTS

| | | |
|---|---|---|
| 582545 | 9/1959 | Canada . |
| 176896 | 3/1922 | United Kingdom . |

OTHER PUBLICATIONS

Machines on sale by Bird Machine Company, Inc., and public use thereof, more than one year prior to the filing date of the present application.

*Primary Examiner*—Richard L. Chiesa
*Attorney, Agent, or Firm*—Edgar H. Kent

[57] ABSTRACT

Microcreping apparatus has an assembly of superposed sheet members which are pressed by presser means against a surface of a material being treated to compress the material against the surface of a drive roll preliminary to engagement of the material with a retarding means. The sheet member assembly is supported as a cantilever by holder means to which at least the primary and outer sheet members of the assembly are connected by a plurality of pins on the holder means received in slots in the connected superposed sheet members spaced inwardly across the path of travel of the material adjacent the rearward edge of the sheet members. The slots extend transversely of the direction of travel of the material and have sufficient clearance from the pins to permit movement thereof relative to the pins corresponding to local expansion or contraction of the respective sheet members under heating and cooling respectively.

8 Claims, 8 Drawing Figures

FIG 1
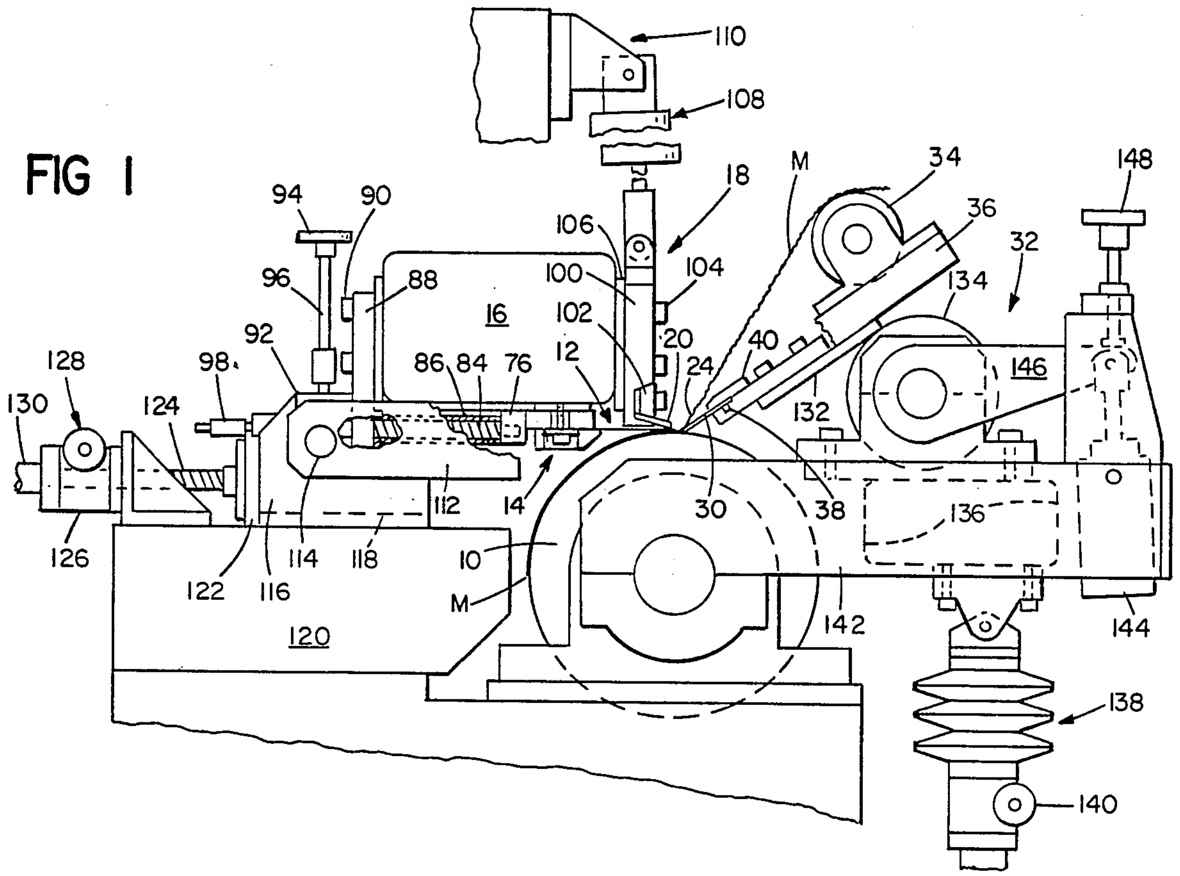
FIG 2
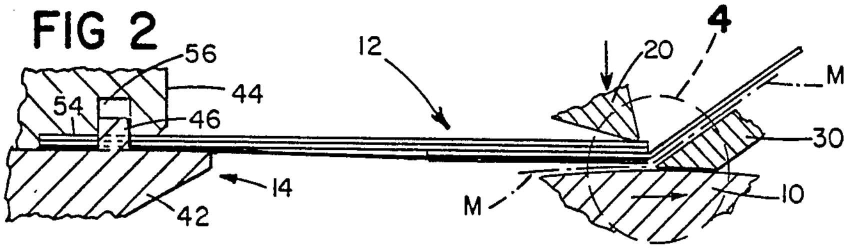
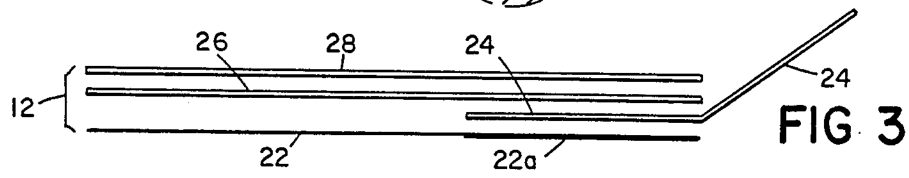
FIG 3
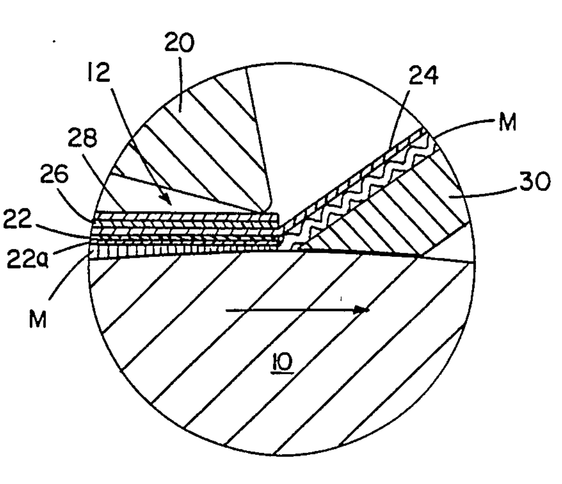
FIG 4

APPARATUS FOR COMPRESSIVELY TREATING TRAVEL FLEXIBLE SHEET MATERIAL

BACKGROUND OF THE INVENTION

This invention relates to apparatus for compressively treating traveling flexible sheet material, more particularly to mechanism of such apparatus which compresses the material against the surface of a drive roll preliminary to its engagement with a retarding surface.

Apparatus of the type concerned is exampled by U.S. Pat. Nos. 3,260,778; 3,416,192; 3,810,280; 4,090,385 and other U.S. patents similar thereto. It is capable of compressively treating the material to produce therein what is generally known as "microcreping", of variable form and extent, depending on nature and adjustment of specific mechanisms, with corresponding variable desirable physical changes in the material which are described in the patents.

In such apparatus, a variable pressure device applies pressure to an assembly of sheet members extending across the path of travel of the material on a rotating drive roll, to compress the material against the surface of the drive roll before the material engages a retarding surface. The nature and extent of the compressive force so exerted on the material are critical in the operation of the apparatus, in that they determine the forward thrust exerted on the material as it engages the retarder surface and the degree of its simultaneous expansion, which are major factors in the treatment. The pressure needs to be resiliently applied, adjustable within limits to suit different materials or desired effects while always avoiding excessive pressure which could damage or undesirably mark the material.

To meet these exacting requirements, the pressure is applied through an assembly of sheet members extended across the width of the material. This assembly includes an inner member closest to the drive roll, commonly called the "primary member" or "primary blade," and an outer member. These are usually of thin spring steel, they may have one or more like members between them and they have been fixedly clamped to the holder means at the region of their edge disposed rearwardly in the direction of travel of the material, so that they form a cantilever from that edge region and are prevented from moving laterally or longitudinally relative to one another. The assembly of sheet members also normally includes one that has its rearward edge in the direction of travel inserted between two of the other sheet members of the assembly, so it is held thereby, without attachment to the holder means. The forward edge of this one sheet member is spaced forwardly of the forward edge of the primary member and has surface engagement with the material advancing beyond the forward edge of the primary member. The material-engaging surface of this one member may be smooth to engage the material and confine it against a retarding surface on the opposite side of the material; or, this surface may be somewhat roughened, to act itself as the retarding surface.

The outer member of this assembly of sheet members is engaged across the width of the material on the roll by a shoe of a variable pressure applying means. The shoe engages the outer sheet member in the cantilevered forward portion of the assembly, usually closely behind the forward edge of the primary member, to flex the free forward portion of the assembly, so that a forward end portion of the inner surface of the primary member is forced against the material on the drive roll with an applied pressure of up to about 100 pounds per linear inch. The pressure means and holder means are mounted for movement longitudinally of the direction of travel of the material into and out of operative position and for adjustment of relative position in that direction.

This combination of mechanisms for applying pressure to the material on the drive roll has worked well and become standard, despite the wide variety of materials which the apparatus is capable of processing. However, it has encountered a serious difficulty due to heat generated in the primary sheet member by the friction of the compressed material slid under it by the drive roll, in turn heating the rest of the assembly. Particularly with materials of high surface friction coefficients, the heat so induced can run as high as 400° F. to 450° F. This results in time in distortion of the primary member with an irregular buckling or corrugation of its material-contacting area, which interferes with its function and is prone to produce unacceptable visible streaking in the material. To mitigate this difficulty, elaborate systems for cooling the assembly have been devised and used. These cooling systems have reduced the adverse effects of the generated heat somewhat but they are not adequately effective in many cases, particularly at the higher temperatures. They are also costly to make and operate.

BRIEF SUMMARY OF THE INVENTION

It has been surprisingly discovered that the problem of distortion of the primary member by heating/cooling is largely overcome, even at the highest temperatures of the range encountered, by freeing the rearward edges of all members of the assembly to expand/contract transversely of the direction of travel of the material. This is done by substituting, for the rearward edge clamp of the prior assembly holder means, a holder provided at intervals across the direction of travel of the material with outwardly projecting pins and by providing correspondingly spaced slots adjacent the rearward edges of all sheet members of the assembly connected to the holder means, so that they may be mounted to the holder by inserting the pins through the superposed slots of the sheet members. The slots have sufficient length transverse to the path of travel of the material beyond that of the pins to accommodate the local transverse expansion/contraction of the connected sheet members.

The clearance of the slots from the pins in the direction of travel is the minimum required to permit assembly, so that there is minimal looseness between holder pins and assembly members when the assembly is adjusted forward and backward in the path of travel of the material. The members of the assembly are not clamped together but are held on the pins by an upper component of the holder, preferably with sufficient clearance to permit bodily application of the assembly to and withdrawal from the pins by relative movement in the direction of travel, to allow the pins to enter the slots through aligned entrance passages to one end of the slots through the adjacent edge of each member.

Extensive tests with this pin and slot connection system show that, without other changes, it works just as satisfactorily under adjustment and in operating condition to effect the requisite adjustable compression of the material. Thus, the prior belief that tight clamping at one edge of the assembly members was needed to prevent relative movement thereof in the assembly, has been shown to have been wrong. Also proved wrong was the pre-belief that the pressure exerted on the assembly near the area of compression would prevent lateral expansion of the assembly members, even if their rearward edges were freed from clamping.

Evidently, it was the combination of the edge clamping with the external pressure which was preventing lateral expansion/contraction of the members resulting in distortion, freeing of the formerly clamped edge of the members allowing the force of expansion/contraction to overcome the resistance of the externally applied pressure. For with the new structure, the members freely expand laterally and the distortion encountered with the prior clamping structure is eliminated or negligible. But to obtain this result, all sheet members that are connected to the holder means should be so connected by the pin and slot mounting; even one clamped at the edge may cause essentially the former distortion problem. The sheet member(s) of the assembly not attached to the holder means is free to expand and contract laterally.

Thus, the apparatus has, as before, a drive roll for the material, retarder means engageable with the material driven by the roll and mechanism for compressing the material against the surface of the drive roll before engagement with the retarder means. As before, this mechanism comprises an assembly of superposed sheet members extending across the width of the material on the drive roll, including an inner primary member disposed closest to the drive roll and an outer member, and holder means connected at least to the primary and outer members adjacent their edges disposed rearwardly in the direction of travel of the material to support the assembly as a cantilever. Also, as before, pressure means applies adjustable pressure to the outer sheet member to flex the suspended portion of the assembly toward the drive roll so that the primary member compresses the material against the drive roll suface, and the pressure means and holder means are mounted for movement into and out of operative position and for adjustment of relative position.

However, in accordance with the invention, the connection of the holder means to sheet members of the assembly is by a plurality of pins on the holder means spaced across the path of travel of the material. The pins are received in corresponding slots in the connected superposed sheet members, adjacent their edge disposed rearwardly in the direction of travel of the material. The slots extend transversely of that direction of travel and have sufficient clearance from the pins to permit movement thereof relative to the pins corresponding to local expansion of the connected sheet members by heat induced therein when the apparatus is operating and to local contraction thereof by cooling when the apparatus is not operating.

Preferably, in order to withstand the strain they are put to, the pins are rectangular, of considerably greater length across the direction of travel than width in that direction. They also may be formed integral with a holder bar rather than depending on welding. Since the degree of expansion or contraction of the sheet members in a given direction is a function of their length or width in that direction, small clearance of slots from the pins in the direction of travel is adequate to accommodate expansion or contraction in that direction.

BRIEF DESCRIPTION OF THE DRAWINGS

In the drawings:

FIG. 1 is a side elevation view, partly in cross-section and partly broken away, of apparatus embodying the present invention.

FIG. 2 is an enlarged side elevation view of the material-compressing sheet member assembly of FIG. 1 and enlarged, fragmentary cross-section views its holder member and parts coacting with the assembly to provide the microcreping action.

FIG. 3 is an exploded end view of the sheet member assembly of FIGS. 1 and 2.

FIG. 4 is an enlarged view of the portion of FIG. 2 within the circle 4, illustrating action on the material which is designated only by a dash line in FIG. 2.

DESCRIPTION OF THE PREFERRED EMBODIMENT

Figure 5:
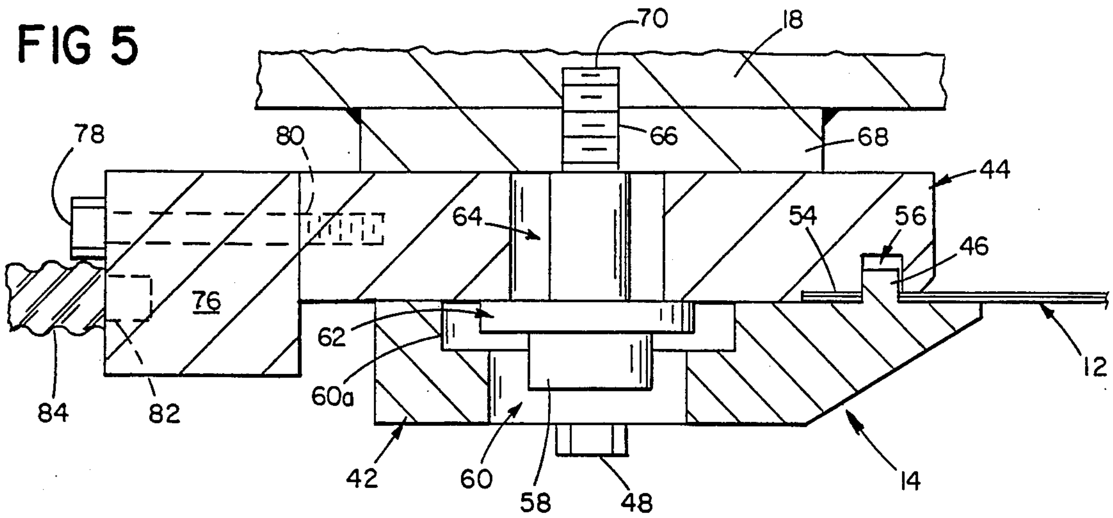
FIG. 5 is an enlarged cross-section view of the holder member for the sheet member assembly and of part of the mechanism for adjusting it.

The apparatus shown in FIG. 1, except for its inclusion of a preferred improved presser mechanism according to the present invention, is a typical example of a microcreper to which the present invention is applicable. Not shown in FIG. 1 is the auxiliary machinery for feeding the material to the drive roll and for transferring the treated material from the microcreper to a rewind stand at a speed coordinated to that of the drive roll to preserve, or desirably modify, effects imparted to the material by the microcreper. Such auxiliary machinery is not only well known but is illustrated and described in aforesaid U.S. Pat. No 4,090,385, to which reference may be had.

In FIG. 1, the material is fed from the left onto the surface of drive roll 10, which rotates clockwise in FIG. 1 to carry the material into surface engagement with the roll-facing surface of the under member or "primary" of an assembly of sheet members. The assembly is designated generally 12 and extends across the path of the material, being supported at its rearward edge in the direction of travel of the material as a cantilever by holding means including a holder member, designated generally 14, and a support member 16, usually called a "head", the connections of which will be subsequently explained. Sheet member assembly 12 is supported with its long edge closest to the path of travel of the material substantially over the vertical diameter of drive roll 10 and is pressed near that edge into compressive engagement with the material by adjustable pressure applying means, designated generally 18.

As shown particularly in the exploded end view of assembly 12 in FIG. 3 and the greatly magnified cross section view of FIG. 4 at the circle 4 in FIG. 2, in the embodiment illustrated in FIG. 1, assembly 12 has four sheet members. These are: the primary 22, the forward under surface of which has slip coating *22a* that engages the material M; a member 24, with a short, flat rearward end held sandwiched between primary 22 and next upper member 26, member 24 having its forward portion extending beyond the other members and bent away from drive roll 10 to form one side of a retarder passage; and outer member 28 which is engaged near its forward long edge by pressure shoe 20 of pressure applying means 18. All members of the assembly in this embodiment are usually of thin spring stainless steel about 0.02 inch (0.6 mm) thick, except primary 22, which is about 0.01 inch (0.3 mm) thick and has a thinner coating 22*a* of a lubricant for slip, such as the material sold under the trade name "Microtube" on the forward portion of its under surface facing the material. All members except 24 are attached to the holder means.

Referring back to FIG. 1, a retarder member 30, usually, as shown, a doctor blade, has its edge engaging drive roll 10 adjacent and opposite the forward end of primary 22 and adjustably held by support mechanism, designated generally 32, so that its material-engaging face is at an upward angle to the horizontal, about 35° in the embodiment shown. Referring again to FIG. 4, the forward edge of primary 22 of assembly 12, the opposed edge of retarder member 30, the drive roll 10 surface between them and the material-engaging surfaces of retarder member 30 and member 24 of assembly 12, define the retarder cavity.

The material M, progressively compressed against the drive roll by primary 22 of assembly 12, expands as drive roll 10 moves it beyond the forward edge of member 22. The extended forward end of member 24 of assembly 12 is angled to the material engaging surface of retarder member 30, such that its forward edge is spaced from the retarder surface slightly less than the expanded thickness of the material M. The material M is thus under spring pressure of the forward edge of member 24 which exerts back pressure on the material. Retarder member 30 has a relatively rough material engaging surface, as compared to that of member 24 of assembly 12. The effects of relative drag and slip of these surfaces, coupled with the back pressure at the forward end of the retarder passage and the drive force of drive roll 10, cause the expanded material to buckle and compact into the fine longitudinal sinuous form characteristic of microcreping, as indicated in FIG. 4.

The material M is drawn from the retarder passage to a rewind stand (not shown) over a guide roller 34 (FIG. 1) mounted on a support member 36 extending across the direction of travel of the material beyond the material edges and forming part of retarder member support mechanism 32. As shown in FIG. 1, retarder member 30 is attached to support member 36 by pins 38 welded thereto, received in a slot in member 36 and held in place by a cap strip 40 bolted to member 30. The conventional mechanism (not shown) for transferring the material from guide roller 34 to the rewind stand includes tension control as previously stated.

Figure 6:
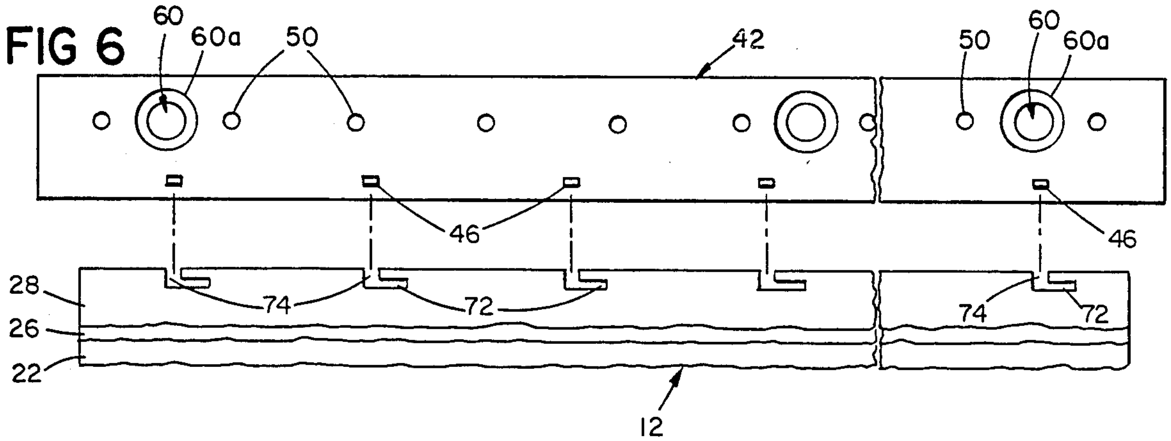
FIG. 6 is a top plan view of the base bar of the holder member and of the portion of the sheet member assembly attachable thereto.
Figure 7:
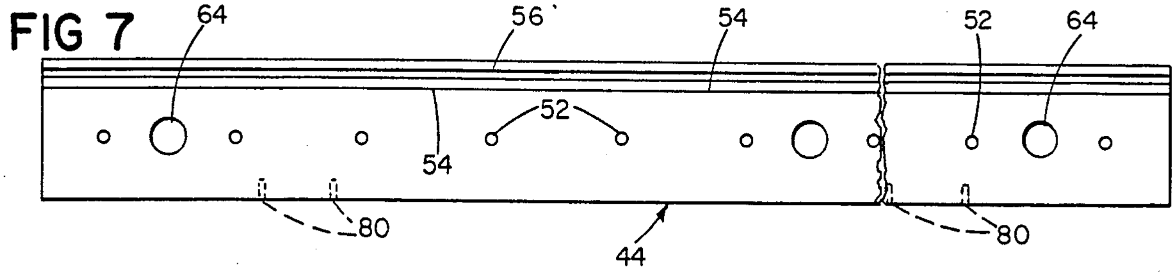
FIG. 7 is a bottom plan view of the cap bar of the holder member for the sheet member assembly.

Describing now holder member 14 and the means of attachment of sheet member assembly 12 thereto according to the invention, as best seen in FIGS. 5-7, member 14 comprises two metal bars, a lower base bar 42 and an upper base bar 44, at least coextensive in length across the direction of travel of the material with such length of the assembly 12, in the embodiment shown, 88 inches (2235 mm) long and about 4 inches (102 mm) in width in the direction of travel. Lower bar 42 has a forward end of tapered, forwardly diminishing thickness on which is located a plurality of pins 46 spaced uniformly along the length of the bar (FIGS. 5 and 6), in the illustrated embodiment at a spacing of centers of slightly over 6 inches (152 mm). As shown, and preferably, pins 46 are rectangular in shape, of greater length longitudinally of the bar than width laterally of the bar, in the illustrated embodiment about 0.38 inches long by slightly more than half of that width. Preferably, also the bars are of stainless steel and the pins 46 are formed by milling out the portions between them of a single rib integral with the bar.

As shown in FIGS. 5 and 7, upper bar 44 has a largely flat under surface adapted for overlying engagement with a corresponding upper surface of bar 42, with the two bars laterally offset, so that the tapered forward portion of bar 42 extends beyond the forward portion of bar 44 and the rearward portion of bar 44 projects beyond the rearward portion of bar 42. The two bars are secured together by bolts 48 (FIG. 5) extending through apertures 50 in lower bar 42 (FIG. 6), spaced evenly along its length, and received in aligned threaded sockets 52 in upper bar 44 (FIG. 7). The forward end of the under surface of upper bar 44 is recessed at 54 so that it is spaced from lower bar 42 by an amount slightly greater than the thickness of the attachable edge portion of assembly 12 (FIGS. 2 and 5), recessed portion 54 having a slot 56 therein extending the full length of upper bar 44 (FIGS. 2 and 7), of a width to receive therein the upper portion of pins 46 on lower bar 42 extending through slots in assembly 12, as hereinafter described.

As shown in FIG. 5, the assembled bars of holder member 14 are secured to the underside of head 18 by bolts 58, the heads of which are located partly in an aperture 60 in lower bar 42 spaced evenly longitudinally of the bar and having predetermined, large clearance from the bolt head (FIGS. 5 and 6). The upper ends of apertures 60 are enlarged at 60*a* to receive, with the predetermined, large clearance, an enlargement of the bolt heads or separate washers 62, the upper surfaces of which seat on the under surface of upper bar 44, with predetermined extensions beyond the wall of lesser diameter apertures 64 in upper bar 44, through which the shanks of the bolts extend with the predetermined clearance (FIGS. 5-7). Reduced threaded ends of bolts 58 extend through matingly threaded apertures 66 in a plate 68 secured to the underside of head 18, into matingly threaded sockets 70 in the bottom wall of the head. Four sets of the bolts 58 and receiving apertures are used in the illustrated embodiment.

While bolts 58 are thus fixed to head 18, the clearances between the bolts and the walls of apertures 60-60*a*, 62 and 64 permit sliding of upper bar 44 between the opposed surfaces of washer 62 and plate 68 for adjustment of the holder member relative to the head, under the control of adjustment mechanism hereinafter described.

Referring to FIG. 6, sheet member assembly 12 is there shown with its edge to be attached in juxtaposition to the upper face of lower bar 42 of holder member 14, the sheet members being broken away part way of their length across, and their width in, the direction of travel. Only three of the four sheet members of the assembly are shown, members 22, 26 and 28, these being broken away short of the rearward edge of member 24, held sandwiched between members 22 and 26 and not otherwise attached to holder member 14. As will be seen, each of sheet members 22, 26 and 28 is provided adjacent its edge to be attached with a series of longitudinal slots 72, spaced longitudinally of the edge to be attached. Slots 72 each terminate at one end, the left end as shown, in an entrance opening 74 to the slot, these entrance openings being slightly wider than the length of pins 46 on base bar 42 and having center lines spaced identically to the longitudinal center lines of pins 46. Slots 72 are slightly wider in the direction of travel than pins 46, so that the latter may slide in the former, to a latched position removed to the right from the entrance openings. All slots and their entrance openings are identically sized, shaped and located in the respective sheet members 22, 26 and 28, so that the members may be superposed, as shown, with their edges and the edges of the slots 72 and entrances thereto 74 also superposed.

With upper bar 44, turned over from its position in FIG. 7, assembled and fixed to lower bar 42 by bolts 48 and the assembled bars attached to head 18 by bolts 58, the sheet member assembly 12 may be attached thereto by moving it from the position shown in FIG. 6 along the dash-line paths until the pins 46 are seated in the forward ends of openings 74, and then sliding assembly 12 to the left to latched position of pins 46 in grooves 72. Removal is effected by the reverse series of movements. Alternatively, the members can be assembled or disassembled one at a time in the same way, starting assembly with member 22. Since it is often desirable to change or adjust the position in assembly 12 of the "floating" member 24, ease of assembly and disassembly of the sheet members relative to the holder member is an important consideration. It has been determined that adequate clearances between the walls of slots 72 and pins 46 can be provided without unduly interfering with precision adjustments of the position of holder member 14 relative to head 18 which need to be made.

The length of slots 72 is such as to accommodate, by relative sliding of pins 46 therein, the local temperature-induced expansion or contraction in length of the sheet members across the path of travel up to maximum anticipated temperature changes which the members will undergo according to the expansion coefficient of the material of which each member is made. Since both ends of the sheet members are free to expand or contract, the amount of growth or shrinkage will be generally cumulative toward each end, so that the slots could be made incrementally shorter as they approach the longitudinal center line of the member, but it is preferred to use a uniform length sufficient for maximum local movement under expansion or contraction.

For adjustment of holder member 14 with assembly 12 attached, there is provided a bar 76 attached to the rearward end of upper bar 44 of holder member 14 by bolts 78 extending through apertures in bar 72 and received in threaded sockets 80 in upper bar 44 of holder member 14 (FIGS. 1, 5 and 7). Bar 76 is provided, adjacent each end of holder member 14, with a smooth-walled socket 82 which rotatably retains one end of a worm shaft 84, one of the sockets and worm shafts being shown in FIGS. 1 and 5. Each of these worm shafts extends through a tube 86 secured at one end to a support 88 fixed to head 18 by bolts 90. Tubes 86 are provided with an internal worm thread mating with the thread of the corresPonding worm shaft 84 so that rotation of the worm shafts 84 in opposite directions causes them to move oppositely in the direction of their length. A casing 92 (FIG. 1) fixed to head 18 contains a shaft (not shown) extending between the worm shafts 84, which is operatively connected to them and is turned in opposite directions by gearing (not shown) operated by hand wheel 94 on vertical shaft 96.

It will be seen that by turning hand wheel 94 in opposite directions, worm shafts 84 will move correspondingly to adjust the position of holder member 14 and assembly 12 relative to head 18 forwardly or rearwardly in the direction of travel, depending on the direction in which the hand wheel is turned. Adjustments of the material engaging position of the forward end of primary 22 of assembly 12 may thus be effected in small increments, as needed.

An indicator device 98 is connected to show the extent and direction of adjustment movement of the worm shafts 84 and holder member 14, such movement being permitted by sliding of upper bar 44 of holder member 14 between the opposed surfaces of washer 62 and plate 68, up to the limit of the clearances in each direction of bolts 58 from the walls of apertures 60, 62 and 64 (FIG. 5).

As shown in FIG. 1, shoe 20 of adjustable pressure applying means 18, is held in a support 100, which, like shoe 20, extends the full width of sheet member assembly 12. Shoe 20 is mounted to support 100 by a bolt and wedge arrangement 102, so that it extends from the support at a forward angle such that its forward end has edge engagement with uppermost sheet member 28 of assembly 12. Holder member 100 is attached to one end of head 16 by bolts 104. Like the bolts 58 in FIG. 5, the bolts 104 are provided with collars or washers (not shown) and the bolt shanks extend with clearance through apertures (not shown) into threaded receiving openings (not shown), respectively, in a plate 106 secured to the end of head 16, and in the end of the head 16. Support member 100 thus is able to slide between plate 106 and the bolt head washers to the extent permitted by the clearances.

A fluid pressure motor 108 (operating connections not shown) has its casing pivotally connected to a support 110 fixed to an upper part of the apparatus frame (not shown) and its piston pivotally connected to the upper center of support 100. It is thus able to apply pressure to slide support 100 relative to head 16 to exert predetermined pressure on the held rearward portion of presser shoe 20.

Head 16 is itself adjustably movable. Still referring to FIG. 1, head 16 has arms 112 fixed to the underside thereof at each end which are pivotally mounted on stub shafts 114 projecting from upstanding end flanges 116 on plates 118 slidable on bed portion 120 of the apparatus frame (such mechanism at one side of the apparatus only being shown in FIG. 1). An upstanding side flange 122 on each plate 118 relatively rotatably holds an end of a worm shaft 124 which extends into a housing 126 fixed to frame bed portion 120. A shaft 128 extends across the apparatus and has worm gearing at each end connected to operate the worm shaft 124 at that end so that, when shaft 128 is turned by a hand wheel (not shown) at one of its ends, both worm shafts 124 are moved correspondingly in the direction of their length, to move head 16 bodily in the direction of travel by sliding plate 118 on frame bed 120. Worm shafts 124 are connected together to assure operation in unison by extensions 130 of each shaft 124 rearwardly of its associated housing 126, extensions 130 being fixedly connected together by a bar (not shown) extending across the apparatus and connected to an indicator device (not shown) like device 92.

It will thus be seen that sliding of the head 16 on frame bed portion 120 by worm shafts 124 and operating mechanism provides a means of adjusting the position of sheet member assembly 12 forwardly and rearwardly in the direction of travel of the material, additional to such means providing sliding of the holder member relative to the head 16. Both adjustments enable extremely fine tuning of position of the forward end of assembly 12 relative to the material on roll 10 and retarder member 30, as is important.

The pivot mounting of head 16 by arms 112 and pivot shafts 114 enables the head to be pivoted bodily so that sheet member assembly 12 is moved into and out of working association with retarder 30. Such movement of the head 16 is permitted by the articulated connections between fluid motor 108 and the apparatus frame and support 100. The broken away motor casing and its piston are long enough so that the motor can be used as the means for effecting pivoting of the head. Adjustable stops (not shown) are provided to limit clockwise pivoting of the head 16 about the axis of shafts 114 in FIG. 1 to its position shown. Motor 108 is thereafter operated to apply the downward pressure so that support 100 slides downwardly and applies the desired pressure to the held ends of shoe 20, transmitted thereby to the forward end of assembly 12. The pivot arms and shafts for head 16 are beyond the opposite ends of the mechanism for adjusting the positions of holder member 14 relative to head 16, so that this mechanism pivots bodily with the head and is not disturbed thereby.

FIG. 1 also shows support mechanism 32 for retarder member 30 such as to provide the needed adjustments in position of the retarder relative to drive roll 10 and sheet member assembly 12. In this mechanism, which differs in detail from the mechanism for the same purpose shown in aforesaid U.S. Pat. No. 4,090,385, support 36 for retarder member 30 and material guide roller 34 is bolted to plate 132, fixed at one end tangentially to the surface of a large tubular shaft 134. Shaft 134, like support 36, extends across the path of travel of the material, and is rotatably mounted at each end, with its axis parallel to that of drive roll 10, in end bearing standards bolted to a support 136 which extends between them.

Support 136 is itself supported at each end by a jack 138 (one shown). Jacks 138 are pivotally connected at their upper ends to support 136 and at their lower ends (not shown) to the apparatus frame, the pivot axis being parallel to the axis of shaft 134. The jacks are equally expanded or contracted to raise or lower support 132 and shaft 134 by turning an operating shaft 140 extending between them by means of a hand wheel (not shown) at one end of it.

A pair of yokes 142 (one shown) are fixedly attached at their mid-section to the respective ends of support 136, are pivotally mounted at one end about the axis of drive roll 10 as shown, and are connected together across the apparatus at their opposite ends. When the jacks 138 are manipulated, the pivot mounting of the yokes 142 about the axis of drive roll 10 causes the frame 136, shaft 134 which it supports and retarder support 36 to move in arcs radial to the axis of drive roll 10, so that the retarder member 30 may be adjusted to different angular positions and surface angle relations of retarder member 30 relative to the surface of drive roll 10, as may be desired. The pivoting of jacks 138 at opposite ends about axis parallel to that of drive roll 10 allows this arcuate path movement, which is also assisted by connecting frame 136 to the jacks 138 somewhat forwardly of its center of gravity.

Each yoke 142 has pivotally mounted in its forward end a fluid motor 144 (one shown without operating connections) between a pair of upstanding flanges (one shown) fixed to the yoke. The piston of motor 144 is pivotally connected to one end of an arm 146 the other end of which is fixedly attached to shaft 134 and is also pivotally connected to an extension thereof carrying a stop 148 at its upper end. When motors 144 are operated to draw their pistons down from the position shown to any extent permitted by stop 148, arms 146 cause shaft 134 to rotate in the clockwise direction in FIG. 1, moving retarder member 30 outwardly, away from the surface of drive roll 10, reversed operation of motors 144 returning the retarder member 30 to original position. The pivoting between parts just described is parallel to the axis of drive roll 10, allowing the parts to self-adjust to different angular positions of frame 136 and supported parts about the axis of the drive roll.

In the FIG. 1 embodiment, the drive roll 10 has a generally continuous surface engaged by the edge of retarder member 30, although the drive roll surface may be somewhat roughened to enhance its grip on the material. Certain materials, such as thin flimsy fabrics or those with surface roughness, have a tendency to snag on the drive roll engaging edge of the retarder member in the FIG. 1 arrangement, resulting in "diving" of the material under that edge, damage and shutdown. To avoid such problem with materials having the potential for it, as shown and described in aforesaid U.S. Pat. No. 4,090,385, the drive roll may be provided with circumferential grooves and the retarder member can be formed with teeth which extend into the grooves. Such change does not require change in the make-up of, or the supporting and adjusting mechanism for, sheet member assembly 12.

With some materials it has been found that similar or even superior results can be obtained by having the retarding surface on the same side of the material as the assembly 12 in FIG. 1. In practice this can be done by changing the shape of a sheet member corresponding to 24 in FIG. 1 and providing it with a roughened surface which has the retarding action on the material. When this is done, retarder member 30 of FIG. 1 is not utilized. Aforesaid U.S. Pat. No. 3,810,280 shows various different configurations for sheet member assemblies, corresponding to assembly 12 of FIG. 1 of this application, which can be utilized when such assembly incorporates a sheet member acting as a retarder. Any of these configurations can be substituted for the assembly 12 in FIG. 1 of the present application, with the retarder member 30 of FIG. 1 removed, or its support 36 backed away from drive roll 10.

Figure 8:
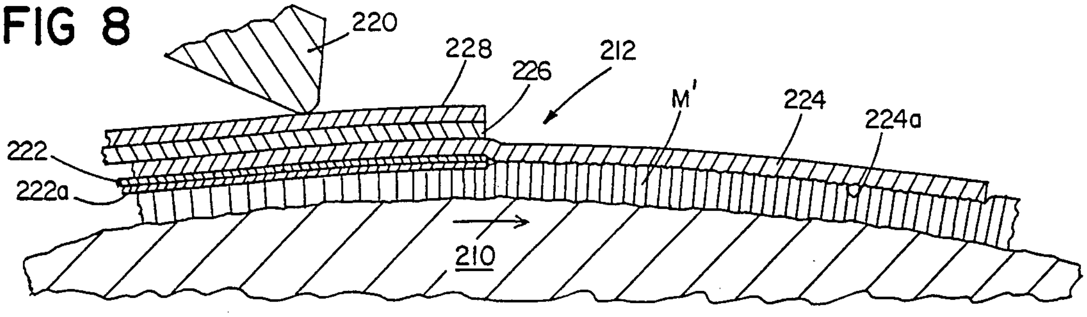
FIG. 8 is a view comparable to FIG. 4 of a modification.

FIG. 8 is a magnified, fragmentary view, similar to FIG. 4 of the present application, of the forward end portion of the sheet member assembly, modified to provide the retarder member, and of associated portions of the material drive roll and the presser foot of FIG. 1. In FIG. 8, the drive roll 210 and the presser shoe 220, together with the rest of the adjustable pressure applying means (not shown), may be the same as in FIG. 1. In the sheet member assembly 212, the primary 222 and the members 226, 228 may also be the same as the corresponding primary 22, and members 26, 28 of assembly 12 in FIG. 1 and may have the same connection according to the invention to the same holder means and adjustment means (not shown) as in FIG. 1.

However, in FIG. 8, while sheet member 224, like corresponding member 24 in FIG. 1 has its rearward edge held sandwiched between primary 222 and member 226, its forward end is bent toward drive roll 210 on a somewhat smaller radius than that of roll 210, instead of being bent away from the roll like member 24 in FIG. 1. Its face 224*a* toward the drive roll 210 is also roughened, as by shot blasting or a coating of silicon carbide, instead of being smooth, as is the corresponding surface of member 24 of FIG. 1. Presser shoe 220 is located further rearward from the forward edge of assembly 212 than the location of shoe 20 relative to that edge of assembly 12 in FIG. 1.

As a result of these differences, the material M' is most compressed against the drive roll surface by primary 222 before it reaches the end of it. As it continues beyond primary 222, the material has to spread sheet member 224 away from roll 210 and thus has its outer surface gripped and retarded by roughened surface 224*a* of member 224. This, in cooperation with the forward driving of the other surface of the material by drive roll 210, results in the microcreping compaction of the material, as indicated in FIG. 8 by the spacing between vertical lines rather than the sinuosity used in FIG. 4. On reaching the forward end of member 224, the material expands away from drive roll 210, which is also moving away from the material, the material having passed beyond the maximum diameter of the roll 210, and can be simply drawn off the roll 210, over a guide roller (not shown) corresponding to roller 34 in FIG. 1.

Instead of the roughened surface 224*a*, a sheet of emery cloth can be used in the FIG. 8 assembly, with member 224 as a backing, as is done in similar FIG. 7 of U.S. Pat. No. 3,810,280 aforesaid. If non-metal members are used in the assembly 212, such as the emery cloth mentioned above and rubber sheet also shown in U.S. Pat. No. 3,810,280, they are held in the assembly in the same manner as member 224, and this would normally be the case if a rubber or like sheet member is used in assembly 12 of FIG. 1. In either the FIG. 1 or FIG. 8 embodiments, the use of at least three sheet members attached to respective holder means is preferred, whether or not a sheet member not so attached is used.

We claim:

1. Apparatus for compressively treating traveling flexible sheet material, having a drive roll for advancing the material, retarder means engageable with the material driven by said roll, mechanism for compressing said material against the surface of said roll before engagement with said retarder means comprising an assembly of superposed sheet members extending across the width of said material on said drive roll, including an inner primary member disposed closest to said drive roll and an outer member, holder means connected at least to said primary member and said outer member adjacent their edges disposed rearwardly in the direction of travel of the material to support said assembly as a cantilever, pressure means to apply adjustable pressure to said assembly to flex the suspended portion thereof toward said drive roll so that said primary member compresses said material against said drive roll surface, and means mounting said pressure means and holder means for movement into and out of operative position and for adjustment of relative position;

wherein the connection of said holder means to sheet members of said assembly is by a plurality of pins on said holder means spaced across the direction of travel of the material and received in corresponding slots in said connected superposed sheet members adjacent their edge disposed rearwardly in said direction of travel, said slots extending transversely of said direction of travel and having sufficient clearance from said pins to permit movement thereof relative to said pins corresponding to local expansion of said connected sheet members by heat induced therein when the apparatus is operating and to local contraction thereof by cooling when said apparatus is not operating.

2. Apparatus according to claim 1 wherein said assembly includes a sheet member intervening said primary member and outer member, which is not connected to said holder means and is retained in said assembly only by surface engagement with adjacent sheet members, having a forward end in said direction of travel arranged to have surface engagement with a surface of the material as the material is advanced forwardly beyond said primary member and engages said retarder means.

3. Apparatus according to claim 2 wherein the material-engaging surface of said sheet member not connected to said holder is adapted to function as a said retarder means.

4. Apparatus according to claim 1 wherein said assembly includes at least one sheet member intervening said primary member and said outer member having said slots for connection to said pins.

5. Apparatus according to any of claims 1 to 4 wherein said pins and slots are of rectangular cross-section, having their longer sides disposed transversely to the path of travel of the material.

6. Apparatus according to claim 5 wherein said holder means comprises a pair of superposed bar members extending across the width of said material on said drive roll, means for securing said bar members together so that their edges disposed forwardly in said direction of travel are spaced apart by a gap sufficient to receive therebetween the edge portion of said assembly containing said slots, one of said bar members having said pins disposed in said gap, the other of said bar members being recessed opposite said pins to receive the free ends of said pins extended through the superposed slots of sheet members of said assembly.

7. Apparatus according to claim 6 wherein said slotted sheet members have openings therein extending from said slots through the adjacent edges of said slotted members to provide passageway therethrough for said pins into and out of said slots.

8. Apparatus according to claim 7 wherein said openings are spaced approximately six inches apart.

* * * * *